United States Patent [19]

Volz

[11] Patent Number: 5,658,637
[45] Date of Patent: Aug. 19, 1997

[54] FLOOR MAT

[75] Inventor: Robert A. Volz, West Chester, Pa.

[73] Assignee: Foamex L.P., Linwood, Pa.

[21] Appl. No.: 460,429

[22] Filed: Jun. 2, 1995

Related U.S. Application Data

[63] Continuation-in-part of Ser. No. 303,475, Sep. 9, 1994, abandoned.

[51] Int. Cl.$^6$ .................................................. B32B 3/02
[52] U.S. Cl. ........................ 428/95; 428/85; 428/96; 428/304.4; 428/314.4; 428/314.8
[58] Field of Search .................................. 428/85, 88, 95, 428/96, 304.4, 309.9, 314.2, 314.8, 317.1, 317.7

[56] References Cited

U.S. PATENT DOCUMENTS

| | | |
|---|---|---|
| 3,804,699 | 4/1974 | Johnson . |
| 4,269,881 | 5/1981 | Johnson et al. . |
| 4,707,895 | 11/1987 | Lang ........................................... 428/95 |
| 4,876,135 | 10/1989 | McIntosh . |
| 4,921,742 | 5/1990 | Altus . |
| 5,102,714 | 4/1992 | Mobley et al. . |
| 5,305,565 | 4/1994 | Nagahama et al. . |
| 5,350,478 | 9/1994 | Bojstrup et al. . |
| 5,358,768 | 10/1994 | Wiley, III . |

*Primary Examiner*—Marion E. McCamish
*Assistant Examiner*—Elizabeth M. Cole
*Attorney, Agent, or Firm*—Connolly and Hutz

[57] ABSTRACT

The present invention relates to slip-resistant machine washable floor mats particularly suitable for use in motor vehicles. The floor mats have an upper carpet fabric layer attached with adhesive or by flame lamination to a lower layer of coarse-celled reticulated polyurethane foam having pore sizes within the range of 3 to 80 pores per linear inch (about 0.19 to about 0.02 inch cell diameter). The floor mat has an air permeability greater than about 5 (ft$^3$/min.)/ft$^2$ at 0.5 inch of water pressure drop, which enhances the washing and drying ability of the entire mat.

4 Claims, 1 Drawing Sheet

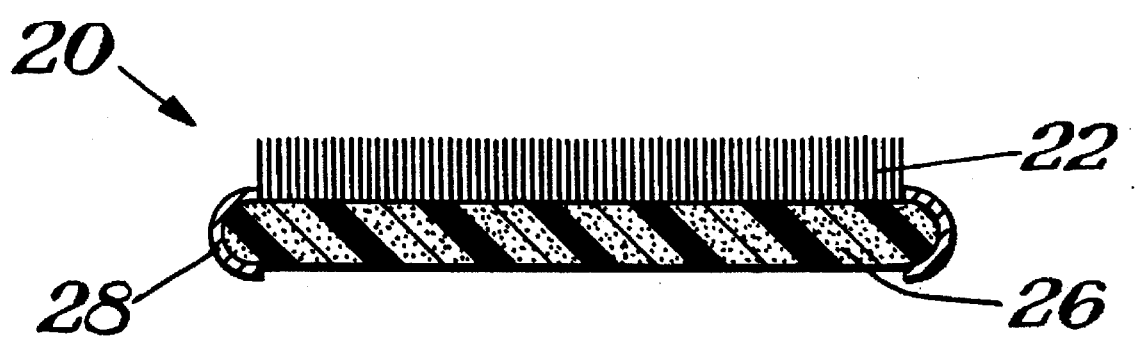

FLOOR MAT

This application is a continuation-in-part of Ser. No. 08/303,475, filed Sep. 9, 1994, now abandoned.

BACKGROUND OF THE INVENTION

1. Field of the Invention

The present invention relates to slip-resistant machine washable floor mats that are especially useful in motor vehicles.

2. Description of the Prior Art

The interior of most motor vehicles has a carpeted floor. Motor vehicle dealerships and auto accessory retail stores offer floor mats that may be positioned atop the carpeted vehicle floor to protect the floor from dirt, abrasion and stains. Such mats may be flat sheets of vinyl or rubber having nips or prongs protruding from one surface. When the sheet is placed atop a carpeted floor with its nipped or pronged side against the carpet, the nips or prongs dig or grab the carpet fibers to prevent substantial sliding movement so as to keep the mat in position.

Alternatively, the mats may be formed by a combination of the pronged or nipped sheet of vinyl or rubber with an attached upper facing layer of carpet. The prongs again prevent the mat from substantially sliding out of place once the mat is positioned on the carpeted floor of the motor vehicle.

To better maintain the mat in position, certain floor mats have attached velcro or snaps to mate with snaps provided in the vehicle interior. For example, U.S. Pat. No. 4,921,742 discloses a floor mat retention system where the floor mat is removably attached to the vehicle with fastening means.

These current floor mats have disadvantages. The nips or prongs of the vinyl mats poke holes or divots into the vehicle carpet, damaging and detracting from the appearance. Where the nips or prongs do not penetrate or dig far enough into the carpet, the mats do not remain substantially in place, but slide out of position. The addition of velcro or snaps is an added cost. The vehicle manufacturer may not supply mating snaps or velcro or the vehicle may not have sufficient space for one to add such fasteners to the vehicle at a later time. The stiff vinyl or rubber that forms the lower layer of the mat is less flexible than carpet alone. Hence, the floor mats with such stiff lower surfaces lack ability to bend around corners or contour to the curves of the vehicle floor. Moreover, these current floor mats are not machine washable due to their high mass and stiffness.

One existing floor mat comprises a layer of carpet on top with a stiffening layer in the middle and a layer of nonreticulated fine-celled foam on the bottom and bonded to the stiffening layer. Fine-celled foam has pore sizes generally greater than 50 pores per linear inch (foam cell diameter of about 0.05 inch). These existing mats lack means to hold them in position on the floor and resist slipping. Moreover, the mats are not machine washable because, among other things, the stiffening layer and the fine-celled foam of the bottom layer used in these mats are not sufficiently air permeable. Moreover, the high mass stiffening layer lacks flexibility and could not be machine washed without harming the tub and moving parts of the washing machine.

U.S. Pat. No. 3,804,699 discloses a slip-resistant mat that has a facing layer of carpeting fabric bonded to a gripping layer of slit polyurethane foam with a bonding layer that contributes required high mass (at least 2 pounds per square yard) and limited flex characteristics to the mat. The bonding layer is the sole adhesive between the facing and gripping layers and provides the mass and isotropic wrinkle resistance to assure that the gripping layer resists lifting forces in traffic and remains in operable contact with the carpeted surface upon which the mat is placed. The mat is not machine washable because, among other things, the high mass bonding layer is not sufficiently air permeable nor sufficiently flexible to be washed in a machine.

A floor mat with a disposable inner absorbent pad is disclosed in U.S. Pat. No. 4,876,135. Once the absorbent pad absorbs liquids and dirt that pass through a top screen, the pad may be removed, discarded and replaced with a fresh pad. The entire floor mat cannot be machine washed. U.S. Pat. No. 5,358,768 discloses a similar mat for the floor of a vehicle in which the top carpet layer is attached to a lower mat of rubber or plastic with Velcro® fasteners. The carpet layer can be removed, cleaned and repositioned, but the entire mat cannot be machine washed.

The slip-resistant floor mats of the present invention eliminate these disadvantages.

BRIEF DESCRIPTION OF THE DRAWING

The Figure is a cross-sectional view of a floor mat of the present invention that has an upper layer of carpet and a lower layer of reticulated polyurethane foam.

SUMMARY OF THE INVENTION

The present invention relates to slip-resistant machine washable floor mats that are especially useful when placed over the carpeted floors in motor vehicles. The floor mat according to the invention is comprised of an upper layer of carpet or rug material that is bonded by low mass adhesive or flame-laminated to a lower layer of a sheet of coarse-celled reticulated polyester or polyether polyurethane foam having a density of from about 0.5 to 6.0 lbs/ft$^3$ and pore sizes in the range of from about 3 to about 80 pores per linear inch (about 0.19 to about 0.02 inch cell diameter). Preferably, the pore size will be in the range of from about 3 to about 60 pores per linear inch (about 0.19 to about 0.04 inch cell diameter), with the range of from about 3 to about 30 (about 0.19 to about 0.09 inch cell diameter) most preferred. The low mass adhesive contributes mass of less than two pounds per square yard to the finished mat. After the composite of the upper and lower layer is cut to the shape desired for the floor mat, the edges are preferably covered with cloth tape and stitched to prevent layer separation, but other suitable measures to bond or hold the edges of the layers together may be employed.

The carpet layer has a thickness of about one-fourth to one-half inch and the foam layer a thickness in range of about one-eighth to about one-half-inch. Preferably, a latex adhesive is used to attach the upper (carpet) and lower (foam) layer together.

When the lower surface of the coarse-celled polyurethane foam is placed against the carpet on a vehicle floor, the cells of the foam and the carpet fibers form a frictional engagement and a mechanical engagement of the carpet fiber into the open polyurethane cells that prevent the mat from transversely slipping or sliding out of position.

The floor mat according to the invention is more flexible or bendable than prior art mats with high mass stiffening layers, such as disclosed in U.S. Pat. No. 3,804,699. It can be used to cover corners or curved and contoured floor surfaces. The reticulated foam drains water rapidly and has a greater air permeability than nonreticulated foam. The floor mat according to the invention has an air permeability greater than about 5 (cubic feet/minute)/square feet at 0.5 inch of water pressure drop. Thus, the floor mat with the lower layer of coarse celled reticulated foam that lacks a stiffening layer dries more rapidly than a floor mat with fine celled nonreticulated foam, or a floor mat with reticulated foam and a high mass stiffening layer. Unlike the prior art mats, the entire floor mat of the present invention may be washed in standard home washing machines.

DESCRIPTION OF THE PREFERRED EMBODIMENT

Referring to the Figure, a floor mat 20 has an upper layer 22 of a carpet fabric or rug material. The lower surface of the upper layer 22 is attached to the upper surface of the lower layer 26 with an adhesive that is moisture resistant, such as GLD3150 latex adhesive supplied by General Latex or a 3M contact adhesive. The upper and lower layers 22, 26 may also be flame laminated together. With flame lamination, the polyurethane foam comes in contact with a flame which depolymerizes the polyurethane foam, forming a tacky, adhesive-like surface on the foam. The surface of the material to be laminated is then brought in contact with the tacky surface of the foam. Upon cooling, the polyurethane repolymerizes, forming a permanent bond between the foam and the material laminated to it, which bond is not substantially affected by temperature or moisture.

The lower layer 26 comprises a sheet of coarse-celled reticulated polyester or polyether polyurethane foam having a density of from about 0.5 to 6.0 lbs/ft$^3$. This foam also should have an CFD$_{25}$ of from about 0.15 to about 3.0 psi, most preferably about 0.33 to about 1.2 psi.

Reticulated foam is foam that has had all of the cell membranes removed, leaving open cells formed by the foam strands. Polyester polyurethane foams may be thermally (flame) or chemically (etch) reticulated. Polyether polyurethane foams normally may only be thermally reticulated. To obtain a reticulated polyether polyurethane foam, the polyether polyurethane foam is cured for a time sufficient for the foam to develop its physical properties, usually about 24 hours after the foam is formed. The cured foam is then introduced into a closed chamber. With the foam enclosed in the chamber, the chamber is evacuated of all air and filled with an explosive mixture of gases, such as hydrogen and oxygen. These gases are ignited with a spark ignition so that a subsonic flamefront travels through the foam, breaking and melting the foam cell membranes, but leaving the foam strands substantially unaffected. The chamber is thereafter filled with air and returned to atmospheric temperature and pressure before the reticulated foam is removed.

The "CFD" of a foam is measured by the Compression Force Deflection Test according to ASTM D3574. The "CFD$_{25}$" numbers indicated above are "rest" values. That is, the force per square inch needed to compress the foam sample 25% of its initial thickness after being held in that position for one minute. The test specimen that is used in the test has a square area of two-inch by two-inch and a one-inch thickness.

Preferably, a polyether polyurethane foam is used because such foams are generally more stable in moist environments and over a greater range of temperatures (hydrolytic stability). The coarse-celled reticulated foam has a pore size in the range of from about 3 to about 80 pores per linear inch (about 0.19 to about 0.02 inch cell diameter). Preferably, the pore size will be in the range of from about 3 to about 60 pores per linear inch (about 0.19 to about 0.04 inch cell diameter), with the range of from about 3 to about 30 (about 0.19 to about 0.09 inch cell diameter) most preferred.

Once the composite of the upper layer 22 and lower layer 23 is formed, the floor mat may be cut to any desired shape. The edges of the mat are then either covered with a cloth binding 28 that is stitched to the mat or edge-sealed or bonded in some other suitable manner.

When the lower side of the lower layer 26 of the floor mat is placed against the carpet in a motor vehicle, the strands of the reticulated foam will penetrate or frictionally engage the fibers of the vehicle carpet to hold the mat in place and prevent substantial relative transverse movement between the mat and the vehicle carpet. The stiff strands of the coarse-celled reticulated polyurethane foam have a much greater frictional engagement than fine-celled nonreticulated polyurethane foams, but do not bore holes or damage the vehicle carpet as do the vinyl prongs or nibs on prior floor mats. In addition, some of the vehicle carpet fibers protrude into the pores of the reticulated foam to provide further frictional and mechanical engagement.

Because the floor mat of the invention lacks the stiffening material of the prior art floor mats and incorporates only reticulated foam in the lower layer, it can be washed in standard household washing machines. Water drains from the reticulated foam particularly well. Moreover, without the stiffening intermediate layer, the floor mat has greater air permeability which fosters complete drying of the entire mat, both exterior and interior. The floor mat of the present invention also is much more flexible and less "boardy" than prior art mats with high mass stiffening layers. The lighter weight and greater flexibility allow the present mats (a) to move more like fabrics when in the tub of a household washing machine; and (b) to be spun within the washing machine tub without causing an imbalance. The flexible mats of this invention may be positioned around corners and contoured to curved surfaces.

The following examples will aid in explaining, but should not be deemed as limiting, the practice of the present invention. In all cases, unless otherwise noted, all parts and percentages are by weight.

EXAMPLE 1

(Constructing a Floor Mat)

Referring to the Figure, a floor mat 20 for a motor vehicle was produced by first adhesive-bonding an upper layer 22 consisting of a sheet of carpet material to the upper surface of a lower layer 26 composed of a sheet of about 0.25 inch thick reticulated polyether polyurethane foam having a pore size of about 14 pores per linear inch (about 0.13 inch cell diameter). General Latex GLD3150 latex adhesive was used for this purpose. The composite material was then cut to the desired shape for the floor mat. The edges of the layers were covered with cloth tape 28 and stitched.

The mat so formed withheld its shape and integrity after being subjected to five washing cycles in a standard washing machine.

The reticulated polyether polyurethane foam used in the floor mat of the present example was produced by the following process. 95.56 parts of polyether polyol (Voranol 3010—Dow) was reacted with 45.9 parts of TDI 80/20 (toluene diisocyanate), 18.0 parts of TDI 65/35 (toluene diisocyanate), 4.7 parts water, 0.75 parts tin catalyst (i.e., stannous octoate catalyst C-9 from Witco Corp.), 0.71 parts amine catalyst (C124—Niax A-1, a proprietary tertiary amine product of Air Products), 0.97 parts of a silicone surfactant (L620 from OSI—a copolymer of polyether and polysiloxane), 1.0 part of n-ethyl morpholine (NEM), 13.0 parts of a fire retardant (FR-2 from Akzo—2,3 di-chloropropylphosphate), 2.5 parts of an organo-arsenic biocide (Vinyzene from Morton-Thiokol), and 5.5 parts Rebus Black 1104 (a proprietary mixture of black pigment and a polyester resin). The isocyanate index was 115 (i.e., a 15% excess of isocyanate over the stoichiometric amount).

All of the above ingredients were combined in a mixing chamber and agitated at high speed to form a reactive mixture. This reactive, foam-forming mixture was then discharged or dispensed from the mixing chamber onto a moving casting conveyor and allowed to rise and cure into the final foam product at ambient temperature and pressure. The resulting polyurethane foam had a density of about 1.6 lbs/ft$^3$ and a $CFD_{25}$ of about 0.42 psi. The pore size of the foam was about 14 pores per linear inch (about 0.13 inch cell diameter). The resulting polyether polyurethane foam was then thermally reticulated.

EXAMPLE 2

(Measuring Air Permeability)

Air permeability was measured for four floor mat constructions using an air permeability measuring apparatus manufactured by Frazier Precision Instrument Co., Inc.. With this apparatus, air drawn through a clamped down sample by a given suction is measured with orifice-type flow meters. The pressure drops across the sample and across the orifice for measuring air flow are measured with manometers. The amount of air flowing through the sample is determined from the pressure drop in units of (cubic feet/minute)/square foot at 0.5 inch of water pressure drop. The air permeability is greater at higher readings.

| Construction | Carpet/ stiffening layer/ reticulated foam (11 ppi) | Carpet/ latex adhesive/ reticulated foam (11 ppi) | Carpet/ flame laminated reticulated foam (11 ppi) | Carpet/ bonding layer/ nonreticulated foam (70 ppi) |
| --- | --- | --- | --- | --- |
| Air permeability ((ft$^3$/min.)/ft$^2$) at 0.5 in. of water pressure drop | 0 | 12.9 | 13.6 | 0 |

The invention has been particularly shown and described with reference to preferred embodiments thereof. Those skilled in the art will understand, however, that various changes in form and details may be made without departing from the spirit and scope of the invention as defined in the appended claims.

I claim:

1. A slip-resistant floor mat, consisting essentially of:

(a) an upper layer of carpeting fabric having an upper and a lower surface; and (b) a lower layer of reticulated foam having a pore size of about 3 to about 80 pores per linear inch attached to the lower surface of the upper layer by flame lamination; wherein the floor mat has an air permeability above about 5 (cubic feet/minute)/square feet at a pressure drop of 0.5 inch water.

2. The floor mat of claim 1, wherein the lower layer is formed from polyether polyurethane foam.

3. The floor mat of claim 1, wherein the lower layer is a polyurethane foam having a pore size in the range of about 3 to about 60 pores per linear inch.

4. The floor mat of claim 1, wherein the lower layer is a polyurethane foam having a pore size in the range of about 3 to about 30 pores per linear inch.

* * * * *